United States Patent [19]
Seitzer

[11] 3,901,668
[45] Aug. 26, 1975

[54] MANUFACTURE OF OXYGEN FROM HIGH TEMPERATURE STEAM

[75] Inventor: Walter H. Seitzer, West Chester, Pa.

[73] Assignee: Sun Ventures, Inc., St. Davids, Pa.

[22] Filed: Nov. 5, 1973

[21] Appl. No.: 412,998

[52] U.S. Cl. .................................................. 55/16
[51] Int. Cl.² ........................................... B01D 53/22
[58] Field of Search .................. 23/281; 55/16, 158; 423/579, 644, 648

[56] References Cited
UNITED STATES PATENTS

| | | | |
|---|---|---|---|
| 2,444,222 | 6/1948 | Craig | 55/158 |
| 3,155,467 | 11/1964 | Yamamoto et al. | 55/16 |
| 3,241,293 | 3/1966 | Pfefferle | 55/16 |
| 3,278,268 | 10/1966 | Pfefferle | 23/281 |
| 3,350,176 | 10/1967 | Green et al. | 55/158 |
| 3,365,276 | 1/1968 | Childs et al. | 55/16 |

OTHER PUBLICATIONS
Mellor's, "Comprehensive Treatise on Inorganic and Theoretical Chemistry," Vol. 1, pp. 491–493.

*Primary Examiner*—Charles N. Hart
*Attorney, Agent, or Firm*—George L. Church; Donald R. Johnson; Paul Lipsitz

[57] ABSTRACT

A process for preparing oxygen from steam by dissociating steam into hydrogen and oxygen at a temperature above 1,500°C., passing the dissociated steam through a first chamber having a wall in common with a second chamber, which common wall is permeable to hydrogen, and cooling the gaseous effluent from said first chamber to yield an oxygen rich stream.

4 Claims, 1 Drawing Figure

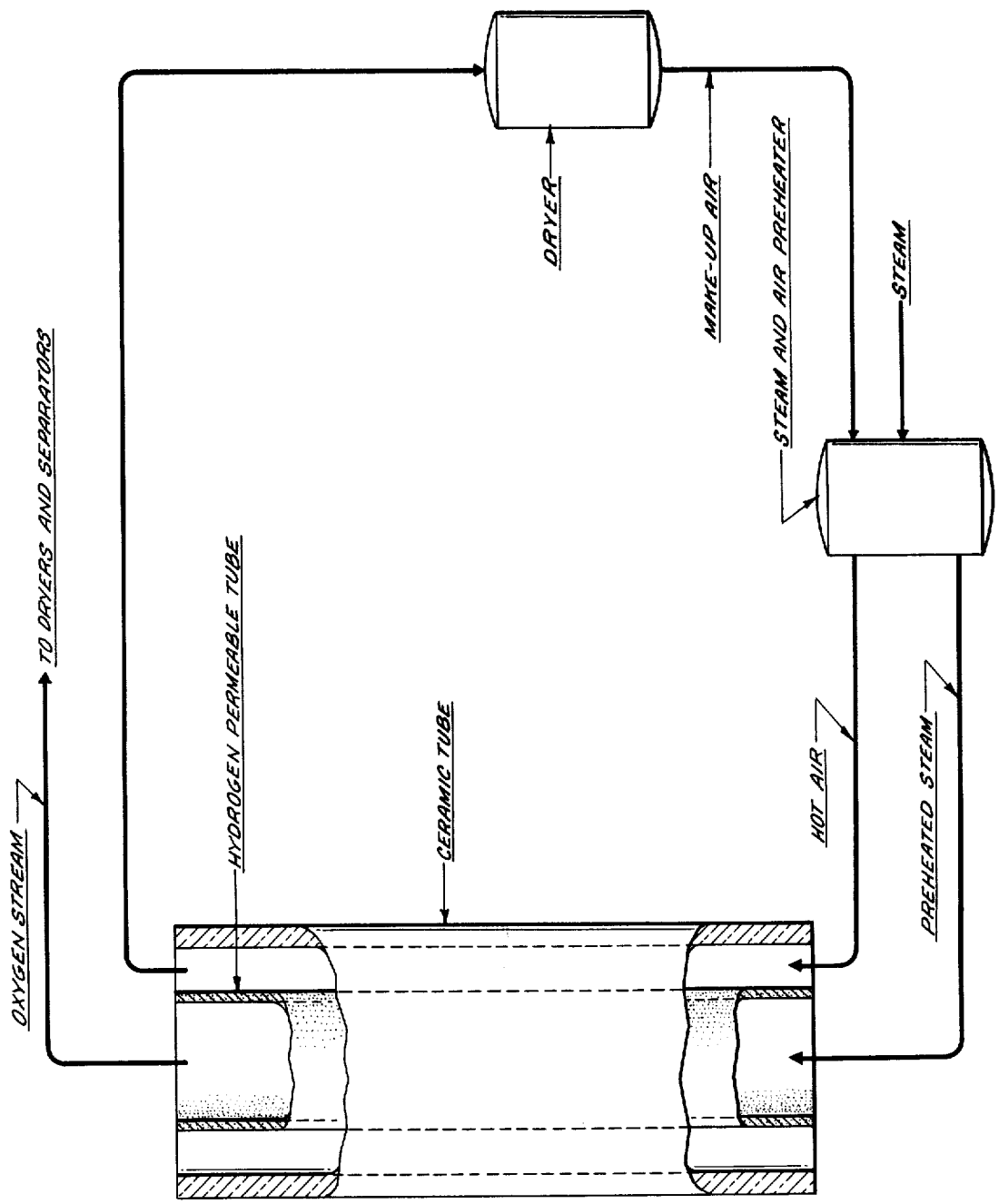

MANUFACTURE OF OXYGEN FROM HIGH TEMPERATURE STEAM

Oxygen is a commercially important industrial commodity and improved processes for oxygen manufacture are of high significance. The present invention provides a simple, easily controlled, low cost process for oxygen using water as the oxygen source.

In accord with the invention, steam is dissociated into oxygen and hydrogen by heating it to a temperature above 1,500°C. and the dissociated steam passed through a first chamber having a wall in common with a second chamber, which common wall is permeable to hydrogen and through which wall said hydrogen passes to said second chamber, and cooling the gaseous effluent from said first chamber to yield an oxygen rich steam.

It will be understood that the dissociation of the steam used in the process may be made externally or within the first chamber having the hydrogen permeable common wall. Preferably however, the actual steam dissociation will be made to occur within the first chamber and this is readily accomplished by preheating the steam in a separate furnace and thereafter passing it into the first chamber which will be held at a temperature between about 1,500°C. to about 2,500°C. preferably about 1,800°C. to about 2,200°C., most preferably about 2,000°C.

It will also be understood that the configuration of the first and second chambers having a common hydrogen permeable wall may take several equivalent forms. For example, two adjacent channels sharing a wall and each channel having a square or rectangular cross-section may be used, but, preferably, two concentric tubes readily provide the two required chambers for the process of the invention. In such an arrangement the inside of the inner tube provides the first chamber, the wall of the inner tube being the common wall separating the first chamber from the second chamber which is the space between the wall of the inside tube and the wall of the outer tube. In order to obtain the necessary hydrogen permeable wall, metallic construction materials such as iridium, ruthenium, molybdenum, tungsten, and like materials will be used which have melting points above about 2,000°C. The usual palladium and silver permeable materials are not useful in this invention because they will melt at the high temperatures employed. In the preferred construction an iridium tube (m.p. 2,456°C.) is simply placed within a ceramic tube (e.g. mullite, alundum, zirconia, etc.) to obtain the required apparatus. Preferably an iridium tube within a mullite tube will be employed. It will be understood however, that the inner tube may be "plated" on the inside with the oxygen permeable material. Thus, a porous clay tube having a thin film of iridium or tungsten (m.p. 3,400°C.), and the like on the inside surface will be effective for the process.

It is also advantageous in carrying out the process of the invention to sweep the second chamber into which hydrogen permeates with a gas in order to rapidly remove the hydrogen and thus act as a driving force for continual permeation of hydrogen to the second chamber. Any type of hydrogen reactive or nonreactive gas may be used for this purpose and the preferred gas is air. Preferably, the air will be preheated and the oxygen therein will react with the hydrogen in the chamber to form water and this will further enhance hydrogen removal. Thus, the effluent from the first chamber will be very high in oxygen content. The drawing further illustrates the process and shows a preheater section to generate steam which is passed into the first chamber of a concentric tubular reactor having an iridium inner tube and held at about 2,000°C. Heater air is passed through the second chamber where the hydrogen which has permeated through the common wall reacts with the oxygen in the air to produce water. The hot spent air may be used to combust fuel to preheat the air and to make steam for the process. The effluent stream from the inner chamber of the steam dissociation reactor contains oxygen in high concentration and this stream is simply cooled and dried to provide an oxygen product of high purity.

In order to further illustrate the invention the following examples are given:

EXAMPLE 1

A ceramic tube with one-fourth inch inside chamber is placed in a three foot long gas-fired oven. Inside this tube is placed an iridium tube of three-sixteenths inch outside diameter with a one-sixty-fourth inch wall thickness. During reaction the oven is maintained at about 2,000°C.

As the source of steam, water is pumped at a rate of 10 grams per hour through a coil heated at 1,000°C. This hot vapor is passed through the inner iridium tube. Simultaneously, air passed through the space between the inner and outer tube of the apparatus where the oxygen in the air reacts with the hydrogen which had diffused from the inside of the inner tube.

The gas from the inner tube is passed through a condenser to remove the steam, and the final gas collected by displacement of water. After 2 hours this gas accumulation is 4.3 liters and is found to be pure oxygen.

EXAMPLE 2

Following the details of Example 1, but using an inner tube of tungsten, 3.6 liters of oxygen is obtained.

The invention claimed is:

1. A process for preparing oxygen from steam which comprises dissociating steam into hydrogen and oxygen by heating it at a temperature above 1,500°C., passing the dissociated steam through a first chamber having a wall in common with a second chamber, which common wall is permeable to hydrogen and through which wall said hydrogen passes by diffusion at steam dissociation temperature to said second chamber, sweeping said second chamber with a gas to remove said permeated hydrogen, and cooling the gaseous effluent from said first chamber to yield an oxygen rich stream.

2. A process for preparing oxygen from steam which comprises dissociating steam into hydrogen and oxygen by heating at a temperature between about 1,800°C. and 2,200°C., passing the dissociated steam through a first chamber having a wall in common with a second chamber, which common wall comprises a material which is permeable to hydrogen and which melts above about 2,500°C., and through which wall said hydrogen passes by diffusion at steam dissociation temperature to said second chamber, sweeping said second chamber with a gas to remove said permeated hydrogen, and cooling the gaseous effluent from said first chamber to yield a oxygen rich stream.

3. The process of claim 2 where the common wall permeable to hydrogen is iridium.

4. The process of claim 2 where the common wall permeable to hydrogen is tungsten.

* * * * *